US012051383B2

(12) United States Patent
Ozaki et al.

(10) Patent No.: US 12,051,383 B2
(45) Date of Patent: Jul. 30, 2024

(54) DISPLAY DEVICE

(71) Applicant: Japan Display Inc., Tokyo (JP)

(72) Inventors: Tadafumi Ozaki, Tokyo (JP); Tsutomu Harada, Tokyo (JP)

(73) Assignee: Japan Display Inc., Tokyo (JP)

( * ) Notice: Subject to any disclaimer, the term of this patent is extended or adjusted under 35 U.S.C. 154(b) by 59 days.

(21) Appl. No.: 17/745,090

(22) Filed: May 16, 2022

(65) Prior Publication Data

US 2022/0270558 A1 Aug. 25, 2022

Related U.S. Application Data

(63) Continuation of application No. PCT/JP2020/042841, filed on Nov. 17, 2020.

(30) Foreign Application Priority Data

Nov. 18, 2019 (JP) ................................. 2019-208116

(51) Int. Cl.
 *G09G 3/36* (2006.01)
 *G02F 1/1334* (2006.01)

(52) U.S. Cl.
 CPC ......... *G09G 3/3607* (2013.01); *G02F 1/1334* (2013.01); *G09G 3/3677* (2013.01); *G09G 2310/08* (2013.01)

(58) Field of Classification Search
 CPC .......................... G09G 3/3607; G02F 1/1334
 See application file for complete search history.

(56) References Cited

U.S. PATENT DOCUMENTS

| 10,509,268 | B2 | 12/2019 | Kurokawa et al. |
| 2001/0035849 | A1* | 11/2001 | Kimura ................ H10K 59/131 345/76 |
| 2010/0080075 | A1* | 4/2010 | Kunce ................... G11C 11/406 365/230.03 |
| 2017/0004783 | A1* | 1/2017 | Ishihara ................ G09G 3/346 |

(Continued)

FOREIGN PATENT DOCUMENTS

| CN | 108630139 A | 10/2018 |
| JP | 2018-180196 A | 11/2018 |

(Continued)

OTHER PUBLICATIONS

International Search Report issued in International Patent Application No. PCT/JP2020/042841 on Feb. 16, 2021 and English translation of same. 5 pages.

(Continued)

*Primary Examiner* — Samantha (Yuehan) Wang
(74) *Attorney, Agent, or Firm* — K&L Gates LLP

(57) ABSTRACT

According to an aspect, a display device includes: a display panel including a display area provided with a plurality of pixels; and a light source configured to emit light to the display panel. Writing periods and lighting periods are alternately provided in one frame period for at least one color. Each writing period is a period in which part of a pixel signal is written to a corresponding one of the pixels. Each lighting period is a period in which light is emitted to the pixel after a corresponding one of the writing periods. A light amount in at least one of the lighting periods is larger than a light amount in other lighting periods.

16 Claims, 11 Drawing Sheets

(56) References Cited

U.S. PATENT DOCUMENTS

2018/0182353 A1\* 6/2018 Chen ................. G09G 5/022
2018/0240418 A1\* 8/2018 Kobayashi .......... G09G 3/2003
2019/0325835 A1 10/2019 Ozaki
2022/0353486 A1\* 11/2022 McCready ............. G06T 15/00

FOREIGN PATENT DOCUMENTS

JP      2019-191291 A    10/2019
WO     WO2015087598 A1   6/2015

OTHER PUBLICATIONS

Written Opinion issued in International Patent Application No. PCT/JP2020/042841 on Feb. 16, 2021. 4 pages.

\* cited by examiner

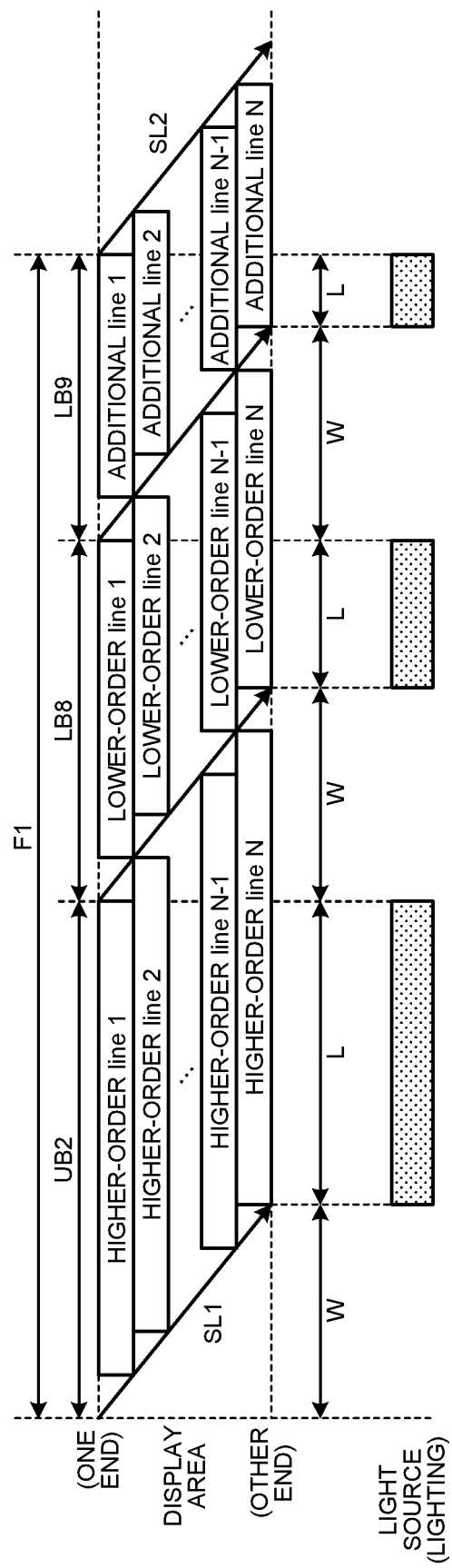

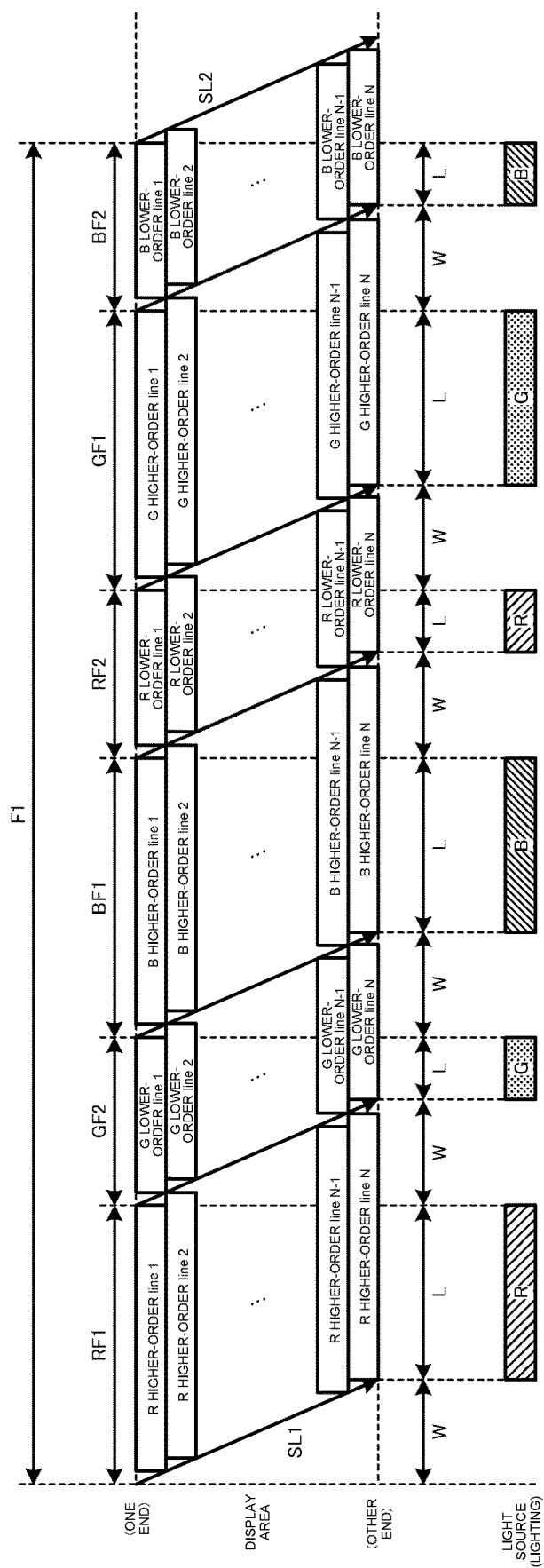

DISPLAY DEVICE

CROSS-REFERENCE TO RELATED APPLICATION

This application claims the benefit of priority from Japanese Patent Application No. 2019-208116 filed on Nov. 18, 2019 and International Patent Application No. PCT/JP2020/042841 filed on Nov. 17, 2020, the entire contents of which are incorporated herein by reference.

BACKGROUND

1. Technical Field

What is disclosed herein relates to a display device.

2. Description of the Related Art

A display device using a polymer-dispersed liquid crystal has been known (for example, Japanese Patent Application Laid-open Publication No. 2018-180196).

It has been requested to increase the number of gradations of an image reproduced by a display device using a polymer-dispersed liquid crystal.

For the foregoing reasons, there is a need for a display device that is higher in number of gradations.

SUMMARY

According to an aspect, a display device includes: a display panel including a display area provided with a plurality of pixels; and a light source configured to emit light to the display panel. Writing periods and lighting periods are alternately provided in one frame period for at least one color. Each writing period is a period in which part of a pixel signal is written to a corresponding one of the pixels. Each lighting period is a period in which light is emitted to the pixel after a corresponding one of the writing periods. A light amount in at least one of the lighting periods is larger than a light amount in other lighting periods.

BRIEF DESCRIPTION OF THE DRAWINGS

FIG. 10 is a time chart illustrating exemplary field sequential control in a fifth modification; and FIG. 11 is a time chart illustrating exemplary field sequential control in a sixth modification.

DETAILED DESCRIPTION

Figure 1:
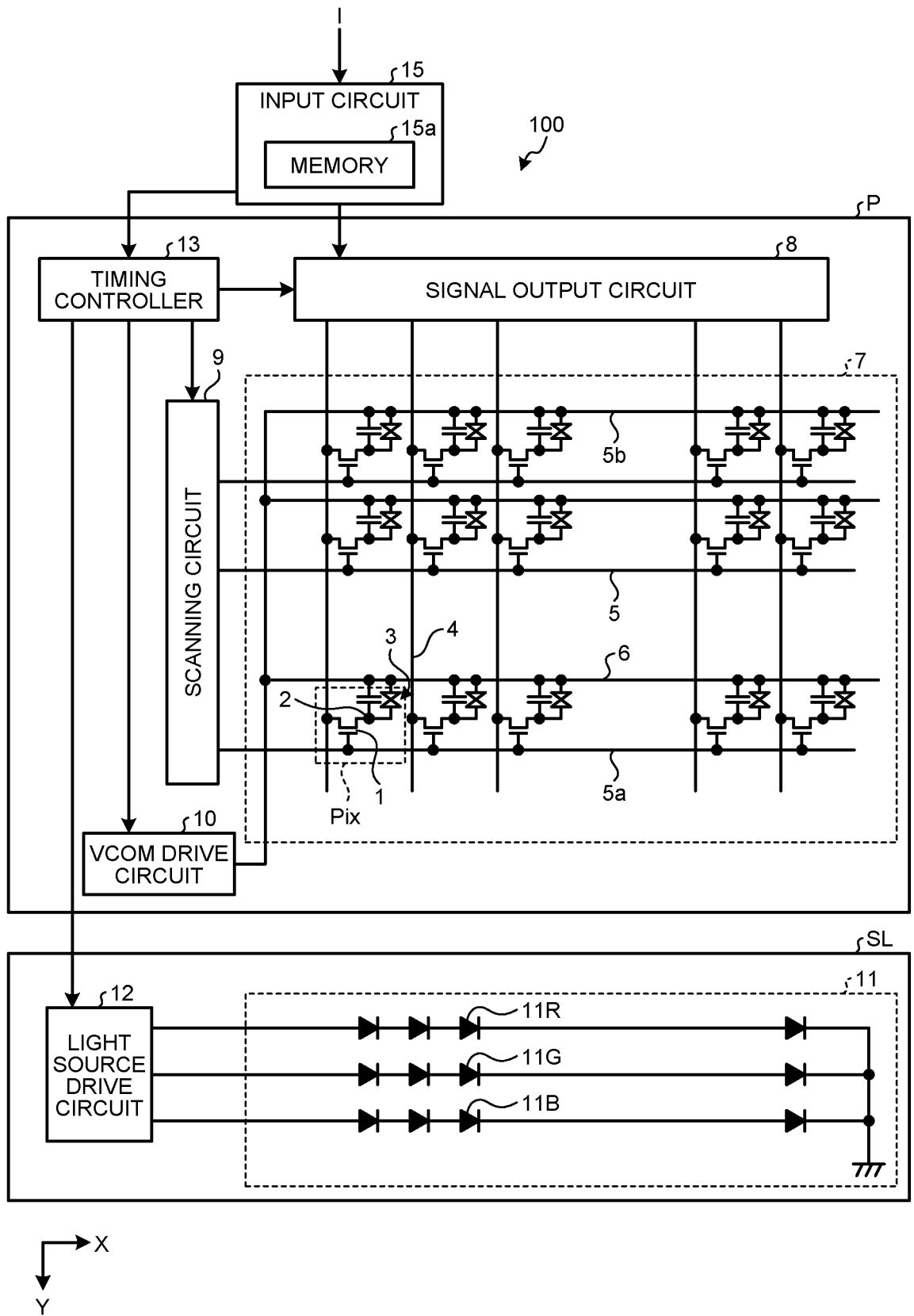
FIG. 1 is a schematic circuit diagram illustrating a main configuration of a display device.

An embodiment of the present disclosure will be described below with reference to the accompanying drawings. What is disclosed herein is merely exemplary, and any modification that could be easily thought of by the skilled person in the art as appropriate without departing from the gist of the disclosure is included in the scope of the present disclosure. In the drawings, the width, thickness, shape, and the like of each component are schematically illustrated for clearer description as compared to actual aspects in some cases, but are merely exemplary and do not limit interpretation of the present disclosure. In the present specification and the drawings, any component same as that already described with reference to an already described drawing is denoted by the same reference sign, and detailed description thereof is omitted as appropriate in some cases.

Embodiment

FIG. 1 is a schematic circuit diagram illustrating a main configuration of a display device 100. The display device 100 includes a display panel P and a light source device SL. The display panel P includes a display area 7, a signal output circuit 8, a scanning circuit 9, a VCOM drive circuit 10, and a timing controller 13. Hereinafter, one surface of the display panel P provided with the display area 7 is referred to as a display surface, and the other surface is referred to as a back surface. Sides of the display device 100 are positioned on both sides of the display device 100 in a direction intersecting (for example, orthogonal to) a direction in which the display surface faces the back surface.

Figure 2:
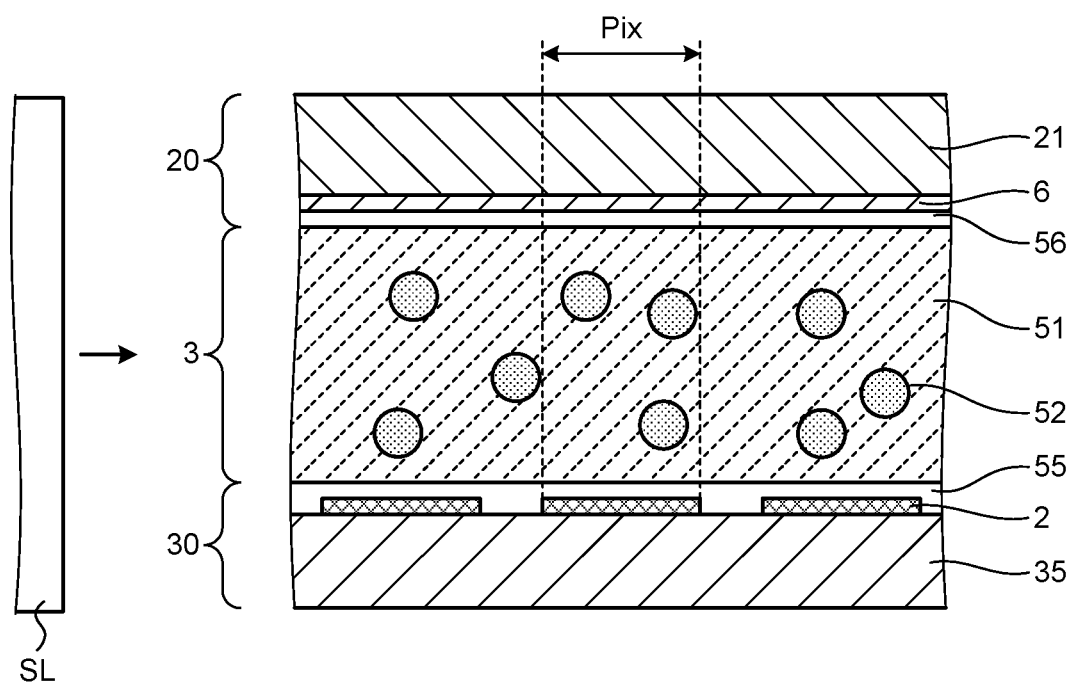
FIG. 2 is a schematic sectional view of a display panel.

In the display area 7, a plurality of pixels Pix are disposed in a matrix (a row-column configuration). Each pixel Pix includes a switching element 1 and two electrodes. In FIG. 1 and FIG. 2 to be described later, a pixel electrode 2 and a common electrode 6 are illustrated as the two electrodes.

FIG. 2 is a schematic sectional view of the display panel P. The display panel P includes two facing substrates and a liquid crystal 3 enclosed between the two substrates. Hereinafter, one of the two substrates is referred to as a first substrate 30, and the other is referred to as a second substrate 20.

The first substrate 30 includes a translucent glass substrate 35, the pixel electrodes 2 stacked on the second substrate 20 side of the glass substrate 35, and an insulating layer 55 stacked on the second substrate 20 side to cover each of the pixel electrodes 2. The pixel electrode 2 is provided individually for each pixel Pix. The second substrate 20 includes a light-transmitting glass substrate 21, the common electrode 6 stacked on the first substrate 30 side of the glass substrate 21, and an insulating layer 56 stacked on the first substrate 30 side to cover the common electrode 6. The common electrode 6 has a plate or film shape with which the common electrode 6 is shared by the pixels Pix.

The liquid crystal 3 of the embodiment is a polymer-dispersed liquid crystal. Specifically, the liquid crystal 3 includes a bulk 51 and fine particles 52. The orientations of the fine particles 52 change in accordance with the potential difference between the pixel electrode 2 and the common electrode 6 in the bulk 51. As the potential of the pixel electrode 2 is controlled individually for each pixel Pix, at least either the degree of translucency or the degree of scattering is controlled for the pixel Pix.

In the embodiment described with reference to FIG. 2, the pixel electrode 2 and the common electrode 6 face each other with the liquid crystal 3 sandwiched therebetween, but the display panel P may have a configuration in which the pixel electrode 2 and the common electrode 6 are provided to one substrate and the orientation of the liquid crystal 3 is controlled by an electric field generated by the pixel electrode 2 and the common electrode 6. The liquid crystal 3 may be a liquid crystal other than the polymer-dispersed liquid crystal.

The following describes a configuration for controlling the potentials of the pixel electrode 2 and the common electrode 6. As illustrated in FIG. 1, the switching element 1 is a switching element using a semiconductor, such as a thin film transistor (TFT). One of the source and drain of the switching element 1 is coupled to one (the pixel electrode 2) of the two electrodes. The other of the source and drain of the switching element 1 is coupled to a signal line 4. The gate of the switching element 1 is coupled to a scanning line 5. Under control of the scanning circuit 9, the scanning line 5 provides potential for opening and closing the source-drain of the switching element 1. This potential control is performed by the scanning circuit 9.

In the example illustrated in FIG. 1, a plurality of the signal lines 4 are arranged in one (row direction) of directions in which the pixels Pix are arranged. The signal lines 4 extend in the other arrangement direction (column direction) of the pixels Pix. Each signal line 4 is shared by the switching elements 1 of more than one of the pixels Pix arranged in the column direction. A plurality of scanning lines 5 are arranged in the column direction. The scanning lines 5 extend in the row direction. Each scanning line 5 is shared by the switching elements 1 of more than one of the pixels Pix arranged in the row direction.

In description of the embodiment, the extending direction of the scanning lines 5 is referred to as an X direction, and the direction in which the scanning lines 5 are arranged is referred to as a Y direction. In FIG. 1, one of scanning lines 5 disposed at both ends in the Y direction among the scanning lines 5 is referred to as a scanning line 5a, and the other is referred to as a scanning line 5b.

The common electrode 6 is coupled to the VCOM drive circuit 10. The VCOM drive circuit 10 provides a potential that functions as a common potential to the common electrode 6. When the signal output circuit 8 outputs a signal to a signal line 4 at a timing at which the scanning circuit 9 provides a potential that functions as a drive signal, to a scanning line 5, a storage capacitor formed between the corresponding pixel electrode 2 and the common electrode 6 and the liquid crystal (fine particles 52) as a capacitive load are charged. Thus, a voltage between the corresponding pixel Pix and the common electrode 6 becomes a voltage corresponding to a gradation signal to be described later. After the drive signal becomes no longer provided, the storage capacitor and the liquid crystal (fine particles 52) as the capacitive load hold states corresponding to the signal output from the signal output circuit 8. The scattering degree of the liquid crystal (fine particles 52) is controlled in accordance with the potential of each pixel Pix and the potential of the common electrode 6. The liquid crystal 3 may be, for example, a polymer-dispersed liquid crystal having a scattering degree that increases as the difference between the potential of each pixel Pix and the potential of the common electrode 6 increases, or may be a polymer-dispersed liquid crystal having a scattering degree that increases as the difference between the potential of each pixel Pix and the potential of the common electrode 6 decreases.

As illustrated in FIG. 2, the light source device SL is disposed on a side of the display panel P. The light source device SL includes a light source 11 and a light source drive circuit 12. The light source 11 includes a first light source 11R configured to emit red light, a second light source 11G configured to emit green light, and a third light source 11B configured to emit blue light. The first light source 11R, the second light source 11G, and the third light source 11B each emit light under control of the light source drive circuit 12. The first light source 11R, the second light source 11G, and the third light source 11B of the embodiment are each, for example, a light source using a light emitting element such as a light emitting diode (LED), but the present disclosure is not limited thereto. Each light source may be any light source, the light emission timing of which is controllable. The light source drive circuit 12 controls the light emission timings of the first light source 11R, the second light source 11G, and the third light source 11B under control of the timing controller 13.

When light is emitted from the light source 11, the display area 7 is illuminated with light incident from one side surface in the Y direction. Each pixel Pix transmits or scatters the light incident from one side surface in the Y direction. The degree of the scattering depends on the state of the liquid crystal 3 controlled in accordance with a signal output from the signal output circuit 8.

The timing controller 13 is a circuit configured to control the operation timings of the signal output circuit 8, the scanning circuit 9, the VCOM drive circuit 10, and the light source drive circuit 12. In the embodiment, the timing controller 13 operates based on a signal that is input through an input circuit 15.

The input circuit 15 outputs, to the timing controller 13 and the signal output circuit 8, a signal based on an input signal I (refer to FIG. 1) from the outside of the display device 100. When a signal indicating an RGB gradation value allocated to a pixel Pix is referred to as a pixel signal, the input signal I that is input to the input circuit 15 in order to output a frame image is a set of a plurality of pixel signals for the pixels Pix provided to the display area 7.

The input circuit 15 of the embodiment is, for example, a field programmable gate array (FPGA) mounted on a non-illustrated flexible printed board coupled to the display panel P or is a circuit that can implement the same function. The input circuit 15 includes a memory 15a for holding data of a frame image. The input circuit 15 outputs, from the frame image stored in the memory 15a, a line image in a writing period of each field period in units of line images as described later with reference to FIG. 3 and other figures. In other words, the memory 15a needs to have a storage capacity capable of outputting line images, for example, in an order as described with reference to FIGS. 3 to 11.

A signal input from the input circuit 15 to the timing controller 13 may be the input signal I or may be a signal indicating the input timing of either the input signal I from the input circuit 15 to the signal output circuit 8 or a signal generated based on the input signal I. It suffices to obtain, from a signal input from the input circuit 15 to the timing controller 13, information necessary for controlling the output timing of a drive signal for providing the signal to each pixel Pix and the operation timing of the signal output circuit 8.

The frame rate, in other words, the number of frame images displayed for one second (the number of times of frame image update) is any number and may be, for example, 60 [Hz] in the embodiment.

Figure 3:
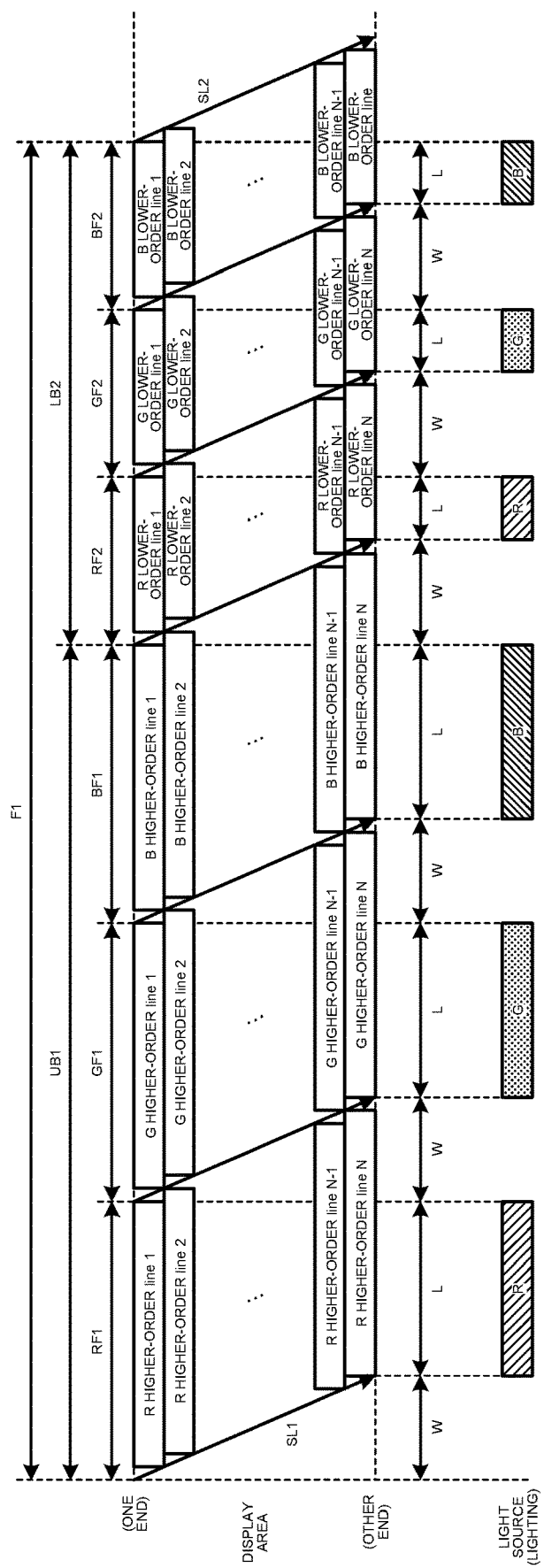
FIG. 3 is a time chart illustrating exemplary field sequential control in an embodiment.

FIG. 3 is a time chart illustrating exemplary field sequential control in the embodiment. A frame period F1 of the embodiment includes a plurality of subframe periods. In the embodiment, the frame period F1 includes a higher-order bit (upper bit) subframe period UB1 and a lower-order bit (lower bit) subframe period LB2 as the subframe periods. The frame period F1 is a period in which operation of the display device 100 for display of one frame image is performed. The higher-order bit subframe period UB1 and the lower-order bit subframe period LB2 each include field periods the number of which corresponds to the number of colors (for example, three) of the light source 11.

In FIG. 3, a first field period RF1, a second field period GF1, and a third field period BF1 are illustrated as the field periods of the higher-order bit subframe period UB1. A first field period RF2, a second field period GF2, and a third field period BF2 are illustrated as the field periods of the lower-order bit subframe period LB2. The first field period RF1, the second field period GF1, the third field period BF1, the first field period RF2, the second field period GF2, and the third field period BF2 each include the writing period W and a lighting period L.

The writing period W is a period in which part of a pixel signal is written to a pixel Pix. In the embodiment, the part of a pixel signal is a signal corresponding to the higher-order bits (i.e., upper bits) of a gradation value indicated by a gradation signal or is a signal corresponding to the lower-order bits (i.e., lower bits) of the gradation value. The gradation signal is a signal included in a pixel signal and corresponding to the gradation value of any of red (R), green (G), and blue (B).

When q represents the number of bits of the gradation signal, the signal corresponding to the higher-order bits is a signal in which the values of higher-order q/2 bits are the same as those of the gradation signal and the values of lower-order q/2 bits are all zero. The signal corresponding to the lower-order bits is a signal in which the values of higher-order q/2 bits are all zero and the values of lower-order q/2 bits are the same as those of the gradation signal. When the signal corresponding to the higher-order bits and the signal corresponding to the lower-order bits are added together, the original gradation signal in expression of a gradation value can be obtained. How to divide the original gradation signal into the higher-order bits and the lower-order bits is not limited to dividing the original gradation signal into higher-order q/2 bits and lower-order q/2 bits. For example, the higher-order bits may be the higher-order q/4 bits, and the lower-order bits may be the remaining bits. The ratio between higher-order and lower-order bits is freely determined.

The lighting period L is a period in which light is emitted to the pixel after the writing period W. Specifically, the pixel Pix is irradiated with light in a state in which the degree of light scattering by the pixel Pix is controlled in accordance with a signal written in the writing period W. Thus, each pixel Pix of the display device 100 is illuminated with light in a color that is lit in the lighting period L, and scatters or blocks the light in a state corresponding to the signal written in the writing period W.

The lighting period L of each of the first field period RF1 and the first field period RF2 is a period in which red (R) light is emitted from the first light source 11R. The lighting period L of each of the second field period GF1 and the second field period GF2 is a period in which green (G) light is emitted from the second light source 11G. The lighting period L of each of the third field period BF1 and the third field period BF2 is a period in which blue (B) light is emitted from the third light source 11B. In this manner, color reproduction can be performed in combination of red (R), green (G), and blue (B) in the higher-order bit subframe period UB1 and the lower-order bit subframe period LB2. In FIG. 3 and other drawings, a color of the light source 11 that is turned on in a lighting period L is indicated by an alphabet in the row of "light source (lighting)".

The higher-order bit subframe period UB1 is a period in which the signal corresponding to the higher-order bits of the gradation value indicated by the gradation signal is written in each writing period W. The lower-order bit subframe period LB2 is a period in which the signal corresponding to the lower-order bits of the gradation value indicated by the gradation signal is written in each writing period W.

The following describes an example of control related to a pixel Pix when an eight-bit gradation value of red (R), green (G), and blue (B), which is indicated by a pixel signal to be written to the pixel Pix in a frame period F1 is (R, G, B)=(255, 17, 1). In this description, the higher-order bits are defined as the higher-order four bits in a bit value corresponding to the eight-bit gradation value indicating the gradation value of each color, and the lower-order bits are defined as the lower-order four bits therein.

In the above-described example, the eight-bit gradation value (255) of red (R) is "11111111" in expression of the values of eight bits. The higher-order bits are "11110000", and the lower-order bits are "00001111". Thus, in the writing period W included in the first field period RF1 of the higher-order bit subframe period UB1, a signal (potential) corresponding to "11110000" is provided to the pixel Pix. In the writing period W included in the first field period RF2 of the lower-order bit subframe period LB2, a signal (potential) corresponding to "00001111" is provided to the pixel Pix.

In the above-described example, the eight-bit gradation value (17) of green (G) is "00010001" in expression of the values of eight bits. The higher-order bits are "00010000", and the lower-order bits are "00000001". Thus, in the writing period W included in the second field period GF1 of the higher-order bit subframe period UB1, a signal (potential) corresponding to "00010000" is provided to the pixel Pix. In the writing period W included in the second field period GF2 of the lower-order bit subframe period LB2, a signal (potential) corresponding to "00000001" is provided to the pixel Pix.

In the above-described example, the eight-bit gradation value (1) of blue (G) is "00000001" in expression of the values of eight bits. The higher-order bits are "00000000", and the lower-order bits are "00000001". Thus, in the writing period W included in the third field period BF1 of the higher-order bit subframe period UB1, a signal (potential) corresponding to "00000000" is provided to the pixel Pix. In the writing period W included in the third field period BF2 of the lower-order bit subframe period LB2, a signal (potential) corresponding to "00000001" is provided to the pixel Pix.

While the degree of light scattering by the pixel Pix is controlled in accordance with the signals (potentials) written to the pixel Pix in this manner, light in colors corresponding to the written signals is emitted in the lighting periods L. The light amount in each lighting period L of the higher-order bit subframe period UB1 is larger than the light amount in each lighting period L of the lower-order bit subframe period LB2. Specifically, when a gradation signal is divided into q/2 higher-order bits and q/2 lower-order bits, the light amount in each lighting period L of the higher-order bit subframe period UB1 is r times larger than the light amount in each lighting period L of the lower-order bit subframe period LB2. The number r is a value obtained by adding 1 to a maximum decimal value that can be expressed by the lower-order bits among the bits of the gradation signal. For example, when the number of bits of the gradation signal is eight, a maximum decimal value that can be expressed by the lower-order bits is 15. Thus, the number r is 16. In this manner, the ratio between the light amount in each lighting period L of the higher-order bit subframe period UB1 and the light amount in each lighting period L of the lower-order bit subframe period LB2 corresponds to the number of bits of the gradation signal. When the number of bits of the gradation signal is q, the higher-order bits are higher-order t bits among the q bits, and the lower-order bits are the remaining bits, the light amount ratio can be expressed as $2t:1$. For example, when the number q is eight, the higher-order bits are four bits, and the lower-order bits are four bits, the ratio between the light amount in the higher-order bit lighting period and the light amount in the lower-order bit lighting period is 16:1. When the number q is eight, the higher-order bit is one bit, and the lower-order bits are seven bits, the ratio between the light amount in the higher-order bit lighting period and the light amount in the lower-order bit lighting period is 2:1.

The light amount is determined by the luminance, which is the strength of light per unit time, and the time of light irradiation. When the luminance of the light source 11 is constant, the light amount is equal to the luminance×a lighting period. In this case, the light amount is smaller as the lighting period, in other words, the time of light irradiation, is shorter; and the light amount is larger as the lighting period is longer. In the embodiment, the light amount is controlled by, for example, the length of the lighting period of the light source 11. FIG. 3 schematically illustrates that the time length of each lighting period L included in the higher-order bit subframe period UB1 is longer than the time length of each lighting period L included in the lower-order bit subframe period LB2. Although FIG. 3 is not illustrated with the ratio (16:1) between the higher-order bits and the lower-order bits, which precisely corresponds to the above-described example; in reality, the time length of each lighting period L included in the higher-order bit subframe period UB1 and the time length of each lighting period L included in the lower-order bit subframe period LB2 are set so as to correspond to the ratio between the higher-order bits and lower-order bits.

As described above, in the embodiment, in the first field period RF1, the pixel Pix is controlled in the writing period W in accordance with the higher-order bits of red (R) of the gradation signal, and red (R) light of the light amount corresponding to the higher-order bits is emitted from the first light source 11R in the lighting period L. In the second field period GF1, the pixel Pix is controlled in the writing period W in accordance with the higher-order bits of green (G) of the gradation signal, and green (G) light of the light amount corresponding to the higher-order bits is emitted from the second light source 11G in the lighting period L. In the third field period BF1, the pixel Pix is controlled in the writing period W in accordance with the higher-order bits of blue (B) of the gradation signal, and blue (B) light of the light amount corresponding to the higher-order bits is emitted from the third light source 11B in the lighting period L. Thus, color reproduction is performed in combination of red (R), green (G), and blue (B) corresponding to the higher-order bits of the gradation signal in the entire higher-order bit subframe period UB1.

In the first field period RF2, the pixel Pix is controlled in the writing period W in accordance with the lower-order bits of red (R) of the gradation signal, and red (R) light of the light amount corresponding to the lower-order bits is emitted from the first light source 11R in the lighting period L. In the second field period GF2, the pixel Pix is controlled in the writing period W in accordance with the lower-order bits of green (G) of the gradation signal, and green (G) light of the light amount corresponding to the lower-order bits is emitted from the second light source 11G in the lighting period L. In the third field period BF2, the pixel Pix is controlled in the writing period W in accordance with the lower-order bits of blue (B) of the gradation signal, and blue (B) light of the light amount corresponding to the lower-order bits is emitted from the third light source 11B in the lighting period L. Thus, color reproduction is performed in combination of red (R), green (G), and blue (B) corresponding to the lower-order bits of the gradation signal in the entire lower-order bit subframe period LB2. Consequently, color reproduction is performed in combination of red (R), green (G), and blue (B) corresponding to the gradation signal in the entire frame period F1 including the higher-order bit subframe period UB1 and the lower-order bit subframe period LB2.

The pixel Pix control in each writing period W is performed for each of the pixels Pix in accordance with the gradation signal provided individually to the pixel Pix.

Specifically, signal writing in each writing period W is performed in units of a plurality of pixels Pix (pixel row) arranged in the X direction and sharing a scanning line 5 as illustrated in FIG. 1. More specifically, at a timing when the drive signal is provided to a scanning line 5, pixels Pix coupled to the scanning line 5 are driven, and at this timing, an individual signal is provided to each of the signal lines 4 arranged in the X direction. Thus, the individual signals are written to the pixels Pix included in a pixel row and sharing the scanning line 5.

In FIG. 3, signals written on a pixel row basis as described above are illustrated with rectangles in the time chart. For example, "R higher-order line 1" represents signals (line 1) for one pixel row, which are written to pixels Pix included in a pixel row coupled to the scanning line 5 (for example, the scanning line 5a) positioned at one end of the display area 7 in the Y direction in the writing period W of the first field period RF1. In addition, "R higher-order line 2" represents signals (line 2) for one pixel row, which are written to pixels Pix included in a pixel row coupled to the second scanning line 5 counting from the one end of the display area 7 in the Y direction in the writing period W of the first field period RF1. In addition, "R higher-order line N−1" represents signals (line N−1) for one pixel row, which are written to pixels Pix included in a pixel row coupled to the second-to-last scanning line 5 counting from the one end of the display area 7 in the Y direction in the writing period W of the first field period RF1. In addition, "R higher-order line N" represents signals (line N) for one pixel row, which are written to pixels Pix included in a pixel row coupled to the last scanning line 5 (for example, the scanning line 5b) counting from the one end of the display area 7 in the Y direction, that is, the scanning line 5 positioned at the other end, in the writing period W of the first field period RF1.

The letter "R" included in illustrations of rectangles such as "R higher-order line 1", "R higher-order line 2", . . . , "R higher-order line N−1", and "R higher-order line N" described above indicates that the gradation signal is a signal corresponding to the red (R) color included in the pixel signal. For example, the letter "G" included in illustrations of rectangles such as "G higher-order line 1", "G higher-order line 2", ..., "G higher-order line N−1", and "G higher-order line N" in the second field period GF1 indicates that the gradation signal is a signal corresponding to the green (G) color included in the pixel signal. The letter "B" included in illustrations of rectangles such as "B higher-order line 1", "B higher-order line 2", ..., "B higher-order line N−1", and "B higher-order line N" in the third field period BF1 indicates that the gradation signal is a signal corresponding to the blue (B) color included in the pixel signal.

The word "higher-order" included in illustrations of rectangles such as "R higher-order line 1", "R higher-order line 2", ..., "R higher-order line N−1", "R higher-order line N", "G higher-order line 1", "G higher-order line 2", ..., "G higher-order line N−1", "G higher-order line N", "B higher-order line 1", "B higher-order line 2", ..., "B higher-order line N−1", and "B higher-order line N" described above indicates a signal corresponding to the higher-order bits. For example, the word "lower-order" included in illustrations of rectangles such as "R lower-order line 1", "R lower-order line 2", ..., "R lower-order line N−1", "R lower-order line N", "G lower-order line 1", "G lower-order line 2", ..., "G lower-order line N−1", "G lower-order line N", "B lower-order line 1", "B lower-order line 2", ..., "B lower-order line N−1", and "B lower-order line N" in the lower-order bit subframe period LB2 indicates a signal corresponding to the lower-order bits.

Arrows SL1 and SL2 in FIG. 3 and other drawings each represent scanning performed in the first writing period W of the corresponding frame period F1. Scanning means operation that sequentially shifts a drive signal output target from either the scanning line 5a or the scanning line 5b to the other one. Such arrows pointing from one end side of the display area to the other end side, including other arrows denoted by no reference sign, represent scanning performed in the corresponding writing periods W. Although not illustrated, when an image is updated in accordance with a frame rate, a plurality of frame periods F1 corresponding to the frame rate are provided so as to be continuous in time.

Through the above-described pixel Pix control divided into the higher-order bits control and the lower-order bits control, it is possible to handle a pixel signal that is input as a signal having gradation levels the number of which is larger than the number of levels at each of which gradation control can be performed in one writing period W for a pixel Pix.

Figure 4:
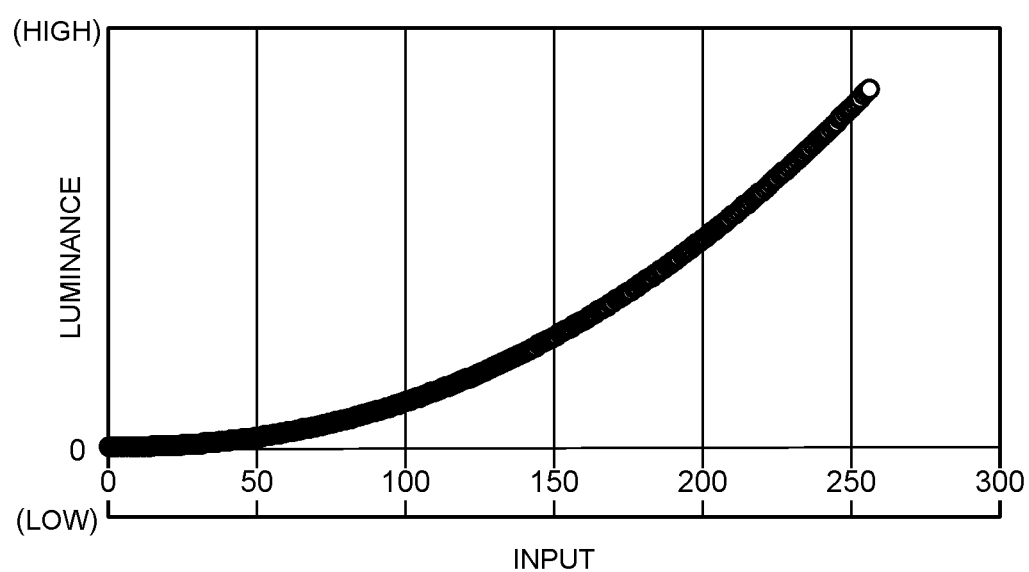
FIG. 4 is a graph illustrating an exemplary gamma curve assumed for an eight-bit pixel signal.
Figure 5:
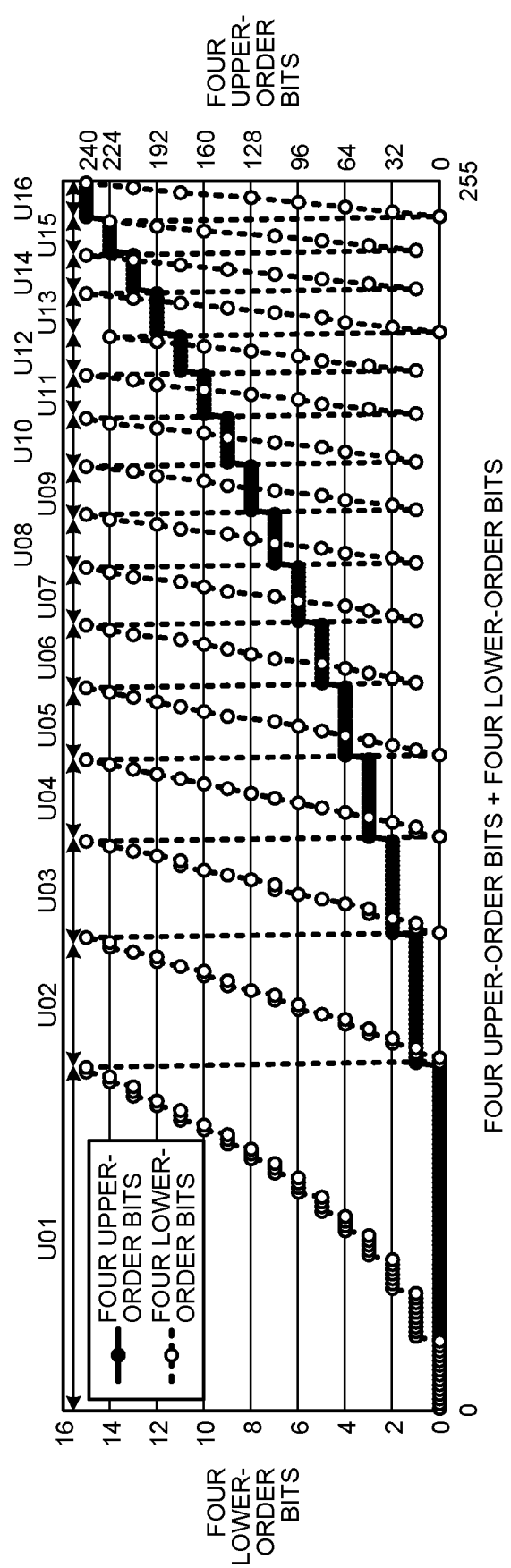
FIG. 5 is a graph illustrating an exemplary relation between the number of levels at each of which gradation control can be performed with the pixel signal and gradation expression in combination of the higher-order bits (upper bits) and the lower-order bits (lower bits)

FIG. 4 is a graph illustrating an exemplary gamma curve assumed for an eight-bit pixel signal. FIG. 5 is a graph illustrating an exemplary relation between the number of levels at each of which the gradation control can be performed with a pixel Pix and gradation expression in combination of the higher-order bits and the lower-order bits.

In the gradation control by light scattering degree control using a polymer-dispersed liquid crystal as in the embodiment, voltage corresponding to the number of gradations (256; 0 to 255) with an eight-bit pixel signal as illustrated in FIG. 4 needs to be directly provided to the polymer-dispersed liquid crystal. In this case, a circuit that drives the polymer-dispersed liquid crystal needs to output voltages of 256 gradations, which complicates the circuit. However, when the eight-bit pixel signal is divided into two, namely, a signal corresponding to the higher-order bits and a signal corresponding to the lower-order bits, each signal can be handled as a four-bit signal in effect. The number of gradations necessary for gradation expression with four bits is 16 (0 to 15), and the circuit that drives the polymer-dispersed liquid crystal only needs to output 16 gradations. In the embodiment, based on such an idea, the higher-order bit subframe period UB1 for performing the gradation control based on the signal corresponding to the higher-order bits and the lower-order bit subframe period LB2 for performing the gradation control based on the signal corresponding to the lower-order bits are provided in the frame period F1.

First, in the higher-order bit subframe period UB1, control is performed based on the signal corresponding to the higher-order bits so that the degree of light scattering (or blocking) of each pixel Pix corresponds to any of the 16 levels. Subsequently, in the lower-order bit subframe period LB2, control is performed based on the signal corresponding to the lower-order bits so that the degree of light scattering (or blocking) of each pixel Pix corresponds to any of the 16 levels. As described above, the light amount in the lighting period L of the higher-order bit subframe period UB1 is r times larger than the light amount in the lighting period L of the lower-order bit subframe period LB2. The number r is 16 when the total number of bits is eight, the higher-order bits are four bits, and the lower-order bits are four bits.

When the 16 levels of the gradation control based on the light amount for the lower-order bits are expressed with the 16 values of "0, 1, 2, 3, 4, 5, 6, 7, 8, 9, 10, 11, 12, 13, 14, and 15", the values of the 16 levels of the gradation control with the higher-order bits that provide r times (r=16) the amount of light provided by the lower-order bits, are "0, 16, 32, 48, 64, 80, 96, 112, 128, 144, 160, 176, 192, 208, 224, and 240". Thus, 256 levels of 0 to 255 can be expressed with a combined use of the higher-order bits and the lower-order bits. For example, the 16 levels of "0 to 15" can be expressed by changing the lower-order bits to "0, 1, 2, 3, 4, 5, 6, 7, 8, 9, 10, 11, 12, 13, 14, and 15" while the higher-order bits is set to "0" and deriving the values of the higher-order bits+the lower-order bits. Specifically, it is possible to perform the gradation control corresponding to the gradation value of "1" with a pixel Pix by performing the gradation control corresponding to "0" in the higher-order bit subframe period UB1 and performing the gradation control corresponding to "1" in the lower-order bit subframe period LB2. In addition, it is possible to perform the gradation control corresponding to the gradation value of "7" with a pixel Pix by performing the gradation control corresponding to "0" in the higher-order bit subframe period UB1 and performing the gradation control corresponding to "7" in the lower-order bit subframe period LB2. In the same manner, the lower-order bits are changed while the higher-order bits are set to any of "0, 16, 32, 48, 64, 80, 96, 112, 128, 144, 160, 176, 192, 208, 224, and 240". Thus, the 256 levels of 0 to 255 can be expressed with a combined use of the higher-order bits and the lower-order bits, for example, "16 to 31" with the higher-order bits set to "1", "32 to 47" with the higher-order bits set to "2", ....

In FIG. 5, gradation ranges when the value of the higher-order bits is 0, 16, 32, ..., 240, are denoted as ranges U01, U02, U03, ..., U16, respectively. A black band in each range represents the gradation control of the pixel Pix corresponding to the value of the higher-order bits. The ratio between the amount of light emitted in the lighting period L in a state of the gradation control of the pixel Pix corresponding to the above-mentioned value of the higher-order bits and the amount of light emitted in the lighting period L in a state of the gradation control of the pixel Pix corresponding to the value (0, 1, 2, ..., 16) of the lower-order bits is 16:1. Thus, the degree of light that is scattered (or blocked) in the frame period F1 is controlled so as to correspond to the number of bits (eight bits) of the pixel signal. Although FIG. 5 illustrates the four lower-order bits with a 16 step gradation with dotted lines, the light amount in the lighting period corresponding to the lower-order bits is $\frac{1}{16}$ times as large as the light amount in the lighting period corresponding to the higher-order bits as described above. Thus, each gradation visually recognized in the frame period F1 corresponds to the sum of the light amount that is set to $\frac{1}{16}$ times as large as the light amount for the higher-order bits through the lighting period corresponding to the lower-order bits and the light amount corresponding to a gradation of the higher-order bits illustrated with a solid line.

The above description is made with the example in which the number of levels of the gradation control of the pixel Pix is 16 and the pixel signal is an eight-bit signal, but the present disclosure is not limited thereto. The present disclosure is also applicable to a combination of another number of bits of the pixel signal and another number of levels of the gradation control of the pixel Pix, when y, which represents the number of bits of the pixel signal, is replaced with the square root of x and x is applied as the number of levels of the gradation control of the pixel Pix.

As described above, according to the embodiment, the display device 100 includes the display panel P including the display area provided with a plurality of pixels Pix, and the light source 11 configured to emit light to the display panel P. The writing periods W and the lighting periods L are alternately provided in one frame period F1 for at least one color. Each writing period W is a period in which part of a pixel signal is written to a corresponding one of the pixels Pix. Each lighting period L is a period in which light is emitted to the pixels Pix after a corresponding one of the writing periods W. The light amount in at least one of the lighting periods L is larger than the light amount in other lighting periods. A larger number of gradations can be expressed with such a combination of at least one lighting period L, in which the light amount is larger than in other lighting periods L, and other lighting periods L. Thus, the display device 100 that is higher in number of gradations can be provided.

The light source 11 includes the first light source 11R, the second light source 11G, and the third light source 11B. The writing periods W and the lighting periods L are provided for each of red (R), green (G), and blue (B). Since such combination of one lighting period L, in which the light amount is larger than in other lighting periods L, and other lighting periods L is provided for each color, a color image can be displayed with a larger number of gradations.

The light amount in one lighting period L, in which the light amount is larger than in other lighting periods L, corresponds to the higher-order bits of the pixel signal, and the light amount in other lighting periods L corresponds to the lower-order bits of the pixel signal. Thus, a larger number of gradations can be expressed by simple signal control based on the pixel signal.

When the display device is configured such that the light amount depends on the lighting time of the light source 11, light amount control can be performed by time length control of each lighting period L, which is simple control.

When the display device is configured such that the light amount depends on the luminance of the light source 11, light amount control can be performed more flexibly in time, without restrictions on the time length of each lighting period L. Light amount control may be performed with a combined use of the lighting time control of the light source 11 and the luminance control thereof. As described above, the light amount is determined by the luminance and the lighting period. When the luminance or lighting period of the light source 11 is constant, the light amount is equal to the luminance x the lighting period. Thus, the light amount may be controlled based on the lighting period while the luminance is kept constant, the light amount may be controlled based on the luminance while the lighting period is kept constant, or the light amount may be controlled with both the luminance and the lighting period as variables.

In the display panel P, the polymer-dispersed liquid crystal (liquid crystal 3) is enclosed between two facing substrates (the second substrate 20 and the first substrate 30). Thus, the display device 100 that is higher in number of gradations can be provided with a configuration using a polymer-dispersed liquid crystal, which tends to have technological difficulties in multi-gradation control.

MODIFICATIONS

The following sequentially describes modifications of the embodiment with reference to FIGS. 6 to 11.

First Modification

Figure 6:
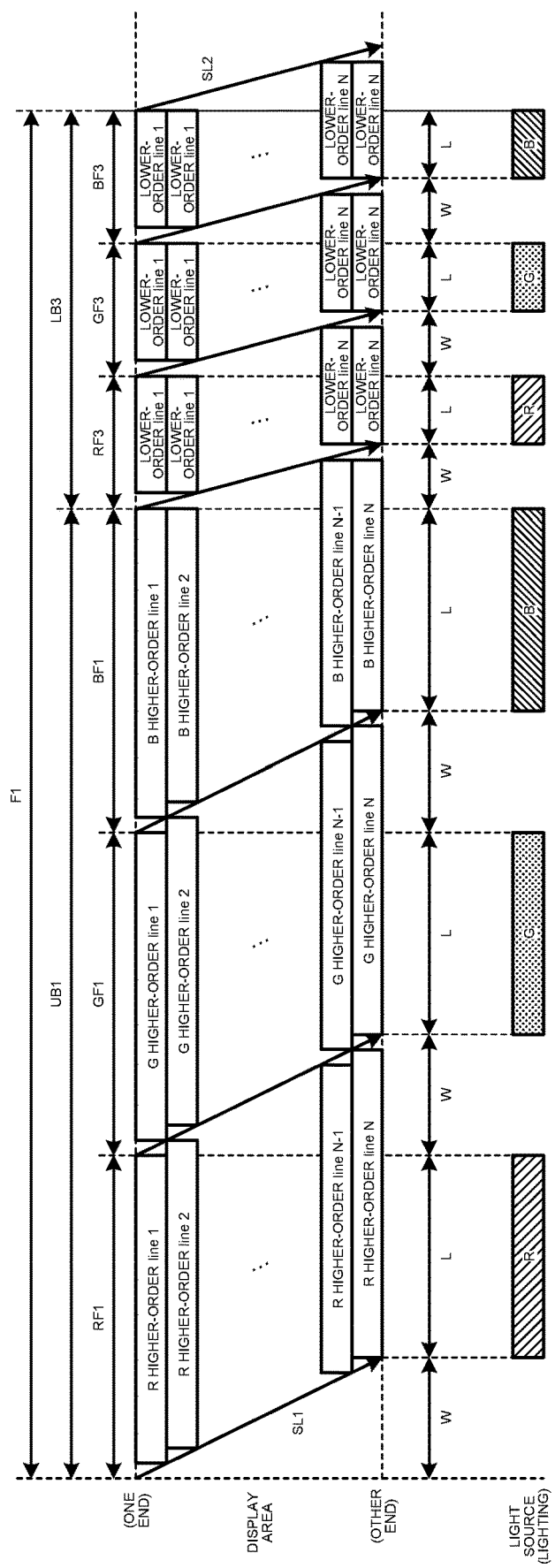
FIG. 6 is a time chart illustrating exemplary field sequential control in a first modification.

FIG. 6 is a time chart illustrating exemplary field sequential control in a first modification. The first modification is the same as the embodiment except that the lower-order bit subframe period LB2 in the embodiment is replaced with a lower-order bit subframe period LB3. The lower-order bit subframe period LB3 is the same as the lower-order bit subframe period LB2 except for features noted below. For example, the lower-order bit subframe period LB3 includes field periods the number of which corresponds to the number of colors (for example, three) of the light source 11. In FIG. 6, a first field period RF3, a second field period GF3, and a third field period BF3 are illustrated as the field periods of the lower-order bit subframe period LB3.

In each writing period W of the lower-order bit subframe period LB3, signal writing in the writing period W is performed in units of at least two pixel rows. More specifically, at a timing when drive signals are provided to at least two scanning lines 5 adjacent to each other in the Y direction, pixels Pix coupled to the scanning lines 5 are driven, and at this timing, an individual signal is provided to each of the signal lines 4 arranged in the X direction. Thus, the individual signals are written to a plurality of pixels Pix included in pixel rows coupled to the at least two scanning lines 5. The same signal is provided to the two pixels Pix sharing one signal line 4. In other words, the same signal is provided to at least two pixels Pix adjacent to each other in the Y direction.

In FIG. 6, signals written in units of two pixel rows are illustrated with rectangles in the time chart. For example, "lower-order line 1" represents signals written to pixels Pix included in pixel rows coupled to at least two scanning lines 5 including the scanning line 5 (for example, the scanning line 5a) positioned at the one end of the display area 7 in the Y direction and another scanning line 5 adjacent to the scanning line 5 in the writing period W of the first field period RF3. In addition, "lower-order line N" represents signals written to pixels Pix included in pixel rows coupled to at least two scanning lines 5 including the last scanning line 5 (for example, the scanning line 5b) counting from the one end of the display area 7 in the Y direction, that is, the scanning line 5 positioned at the other end, and another scanning line 5 adjacent to the last scanning line 5 in the writing period W of the first field period RF3.

Alternatively, "lower-order line 1" may represent signals written to pixels Pix included in a pixel row coupled to the scanning line 5 (for example, the scanning line 5*a*) positioned at the one end of the display area 7 in the Y direction in the lower-order bit subframe period LB2 in the embodiment. Alternatively, "lower-order line 1" may represent signals written to pixels Pix included in a pixel row coupled to another scanning line 5 adjacent to the scanning line 5 positioned at the one end in the lower-order bit subframe period LB2 in the embodiment. Alternatively, "lower-order line 1" may represent the average of the former lower-order bit value and the latter lower-order bit value described above as examples of "lower-order line 1". Specifically, the lower-order bits of pixel signals for a predetermined number (n) of pixels Pix arranged in a first direction (the Y direction) may be averaged, and the average signal is written at a time to each of the predetermined number of pixels Pix arranged in the first direction. It should be noted that n is a natural number equal to or larger than 2. For example, the number n is 2 but may be equal to or larger than 3.

Similarly, "lower-order line N" may represent signals written to pixels Pix included in a pixel row coupled to the scanning line 5 (for example, the scanning line 5*b*) positioned at the other end of the display area 7 in the Y direction in the lower-order bit subframe period LB2 in the embodiment. Alternatively, "lower-order line N" may represent signals written to pixels Pix included in a pixel row coupled to another scanning line 5 adjacent to the scanning line 5 positioned at the other end in the lower-order bit subframe period LB2 in the embodiment. Alternatively, "lower-order line N" may be the average of the former lower-order bit value and the latter lower-order bit value. Although not illustrated, the same configuration described above applies to signal control in signal writing in units of two pixel rows between the one end and the other end.

As for "lower-order line 1" and "lower-order line N" in the writing period W of the second field period GF3, and as for "lower-order line 1" and "lower-order line N" in the writing period W of the third field period BF3, the configurations thereof are the same as that in the writing period W of the first field period RF3 except for the colors corresponding to the signals.

In FIG. 6 and FIGS. 7, 8, and 9 to be described later, illustrations of symbols (R, G, and B) indicating colors are omitted from rectangles representing signals for one pixel row, which are written to pixels Pix in field periods other than the higher-order bit subframe period UB1. However, in reality, in the writing period W of each field period, signals corresponding to the color (R, G, or B) of light to be emitted immediately after the writing period W are written.

According to the first modification, in the display area 7, a plurality of pixel rows are arranged in the first direction (Y direction). Each pixel row includes a plurality of pixels Pix arranged in a second direction (X direction) orthogonal to the first direction. The lower-order bits of pixel signals are written at a time to a predetermined number of pixels Pix arranged in the first direction. The predetermined number is equal to or larger than two. This reduces the scanning time of each writing period W for writing signals corresponding to the lower-order bits and can increase time allocated to any other process performed in the frame period F1. Consequently, it becomes easier to increase the length of each lighting period L and ensure the luminance of display output. The scanning time is time from start to completion of scanning.

When the lower-order bits of pixel signals for a predetermined number (n) of pixels Pix arranged in the first direction (Y direction) are averaged and written at a time to the predetermined number of pixels Pix arranged in the first direction, information of the input signal I for the predetermined number of pixels Pix to which signals are simultaneously written can be averaged and reflected. Thus, it is possible to restrain information from being discarded between inputting and outputting.

Second Modification

Figure 7:
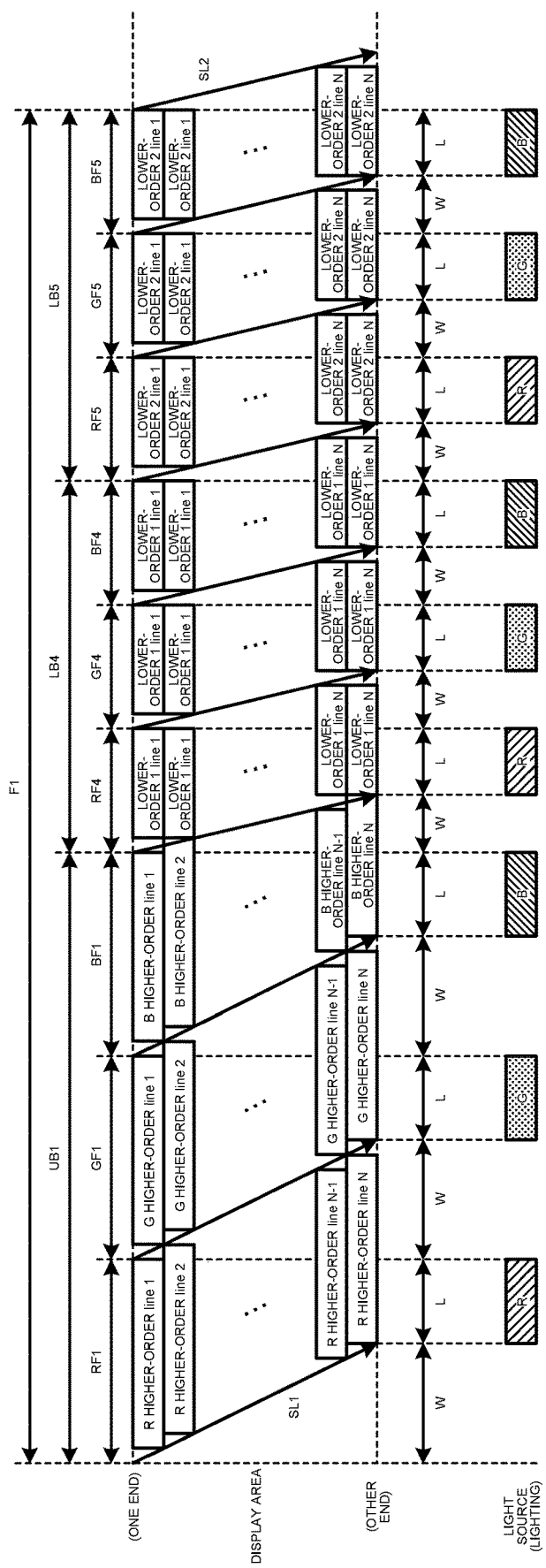
FIG. 7 is a time chart illustrating exemplary field sequential control in a second modification.

FIG. 7 is a time chart illustrating exemplary field sequential control in a second modification. The second modification is the same as the embodiment except that the lower-order bit subframe period LB2 in the embodiment is replaced with a lower-order bit subframe period LB4 and a lower-order bit subframe period LB5. Specifically, the frame period F1 of the second modification includes the higher-order bit subframe period UB1, the lower-order bit subframe period LB4, and the lower-order bit subframe period LB5.

In each writing period W of the lower-order bit subframe period LB4 and each writing period W of the lower-order bit subframe period LB5, signal writing in the writing period W is performed in units of two pixel rows in the same manner as the writing period W of the lower-order bit subframe period LB3. In the second modification, signals written in each writing period W of the lower-order bit subframe period LB4 and signals written in each writing period W of the lower-order bit subframe period LB5 are set so that control of each pixel Pix in accordance with a signal corresponding to eight lower-order bits is performed with combination of the writing period W of the lower-order bit subframe period LB4 and the writing period W of the lower-order bit subframe period LB5.

For example, "lower-order 1 line 1" in FIG. 7 represents signals written to pixels Pix included in pixel rows coupled to at least two scanning lines 5 including the scanning line 5 (for example, the scanning line 5*a*) positioned at the one end of the display area 7 in the Y direction and another scanning line 5 adjacent to the scanning line 5 in the writing period W of a first field period RF4. In addition, "lower-order 2 line 1" in FIG. 7 represents signals written to pixels Pix included in pixel rows coupled to at least two scanning lines 5 including the scanning line 5 (for example, the scanning line 5*a*) positioned at the one end of the display area 7 in the Y direction and another scanning line 5 adjacent to the scanning line 5 in the writing period W of a first field period RF5. The idea of signal control in units of at least two pixel rows in the second modification is the same as in the first modification.

In the second modification, a signal corresponding to the lower-order bits is divided into "lower-order 1 line 1" and "lower-order 2 line 1". The signal corresponding to the lower-order bits may be divided in any given manner. For example, the "least significant bit of the signal corresponding to the lower-order bits" may be allocated to "lower-order 2 line 1" and "bits except for the least significant bit of the signal corresponding to the lower-order bits" may be allocated to "lower-order 1 line 1", or the same number of bits may be allocated to each line. For example, when the gradation signal is an eight-bit signal and the signal corresponding to the lower-order bits is "00000101", the "least significant bit of the signal corresponding to the lower-order bits" is "00000001" and the "bits except for the least significant bit of the signal corresponding to the lower-order bits" are "00000100".

The ratio between the light amount in each lighting period L of the lower-order bit subframe period LB4 and the light amount in each lighting period L of the lower-order bit subframe period LB5 corresponds to the manner of division of a signal corresponding to the lower-order bits. When the signal is divided into the "least significant bit of the signal corresponding to the lower-order bits" and the "bits except for the least significant bit of the signal corresponding to the lower-order bits" as described above and the number of lower-order bits is four, the ratio between the light amount in each lighting period L of the lower-order bit subframe period LB4 and the light amount in each lighting period L of the lower-order bit subframe period LB5 is 8:1. However, the ratio is not limited thereto and may be changed as appropriate.

In FIG. 7, "lower-order 1 line N" represents signals written to pixels Pix included in pixel rows coupled to at least two scanning lines 5 including the last scanning line 5 (for example, the scanning line 5b) counting from the one end of the display area 7 in the Y direction, that is, the scanning line 5 positioned at the other end, and another scanning line 5 adjacent to the last scanning line 5 in the writing period W of the first field period RF4. In addition, "lower-order 2 line N" represents signals written to pixels Pix included in pixel rows coupled to at least two scanning lines 5 including the last scanning line 5 (for example, the scanning line 5b) counting from the one end of the display area 7 in the Y direction, that is, the scanning line 5 positioned at the other end, and another scanning line 5 adjacent to the last scanning line 5 in the writing period W of the first field period RF5. The relation between "lower-order 1 line N" and "lower-order 2 line N" is the same as the relation between "lower-order 1 line 1" and "lower-order 2 line 1".

As illustrated in FIG. 7, when a subframe period in which signals corresponding to the lower-order bits are written is divided into a plurality of periods, the number of gradations can be further increased. The increase in number of subframe periods leads to increase in number of writing periods W provided in the frame period F1, and consequently, the ratio of the scanning time in each writing period W relative to the frame period F1 increases. To address this, signal writing is simultaneously performed for a predetermined number (n) of pixel rows as in the lower-order bit subframe period LB4 and the lower-order bit subframe period LB5, whereby the scanning time is shortened to about 1/n of that for signal writing performed on a pixel row basis.

According to the second modification, two writing periods W and two lighting periods L corresponding to the lower-order bits of the pixel signal are provided in one frame period F1. Thus, it is possible to perform gradation expression closer to a gamma curve while restraining increase in the scanning time along with increase in number of the subframe periods.

In the description with reference to FIG. 7, the lower-order bit subframe period LB4 and the lower-order bit subframe period LB5 are provided as an example when the number (n) of subframe periods for a signal corresponding to the lower-order bits is two, but the number n may be equal to or larger than three. In this case, a subframe period is provided in which, for example, "lower-order 1 line 1", "lower-order 2 line 1", . . . , "lower-order n line 1" are written in units of n pixel rows in each writing period W.

Third Modification

Figure 8:
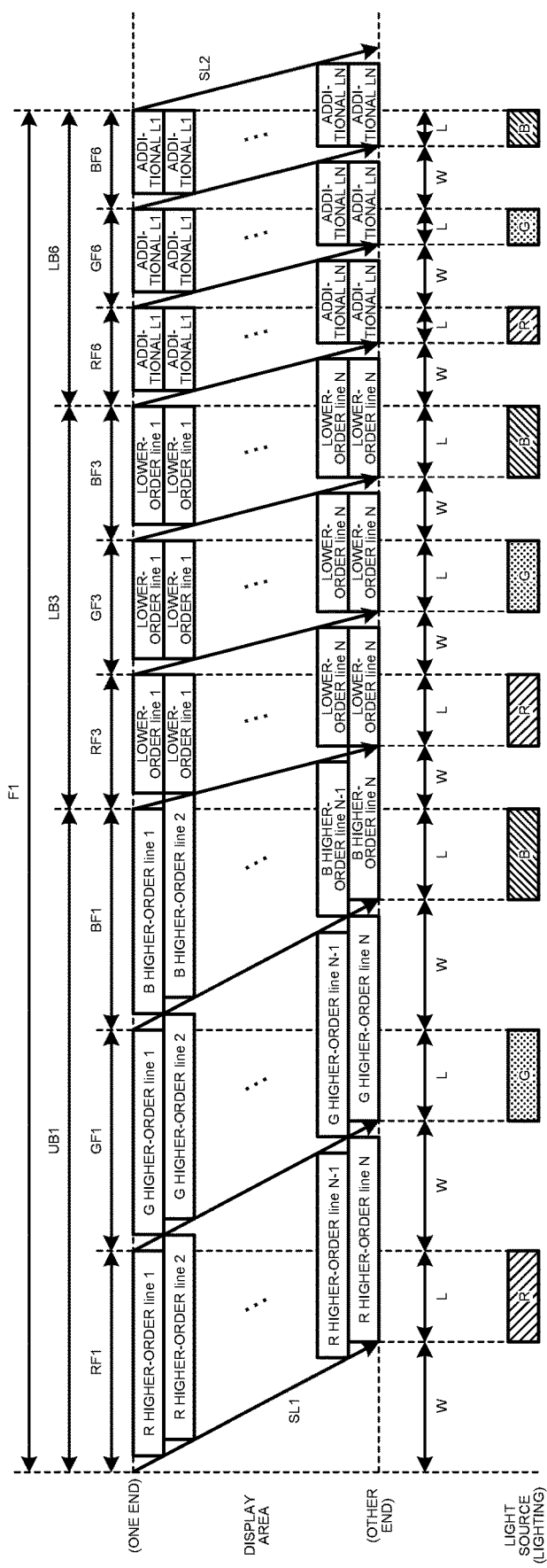
FIG. 8 is a time chart illustrating exemplary field sequential control in a third modification.

FIG. 8 is a time chart illustrating exemplary field sequential control in a third modification. The third modification is the same as the embodiment except that a lower-order bit subframe period LB6 is provided as an additional subframe period after the lower-order bit subframe period LB3 in the first modification.

Specifically, the frame period F1 of the third modification includes the higher-order bit subframe period UB1, the lower-order bit subframe period LB3, and the lower-order bit subframe period LB6.

The lower-order bit subframe period LB6 is used for extended gradation expression that is not included in the original gradation signal as gradation value expression. For example, the gradation signal is an eight-bit signal, the least significant bit (1 or 0) is additionally provided for the writing period W of the lower-order bit subframe period LB6, and thus gradation performance of image display can be further improved. In the third modification, the ratio between the light amount in each lighting period L of the higher-order bit subframe period UB1, the light amount in each lighting period L of the lower-order bit subframe period LB3, and the light amount in each lighting period L of the lower-order bit subframe period LB6 is, for example, $2^{(j+1)}:2:1$. However, the ratio is not limited thereto but may be changed as appropriate.

The lower-order bit subframe period LB6 can be used for, for example, a configuration with which the number of gradations can be further increased like a high dynamic range (HDR), correction of variance in characteristics (the degree of light scattering) among the pixels Pix in the display area 7, and adjustment of luminance gradient. The luminance gradient is luminance non-uniformity in luminance distribution between the light source 11 side and the opposite side caused by occurrence of a tendency that the degree of light scattering is higher on the light source 11 side (at a position closer to the light source 11) and is lower on the opposite side (at a position farther from the light source 11) like an LED (a tendency that light becomes weaker from the light source 11 side toward the opposite side is expressed as gradient). Based on the luminance gradient, the scattering degree of the liquid crystal closer to the opposite side farther from the light source 11 is increased by controlling voltage to be applied to the pixels Pix closer to the opposite side, whereby the scattering degree can be made entirely uniform. With such control, the luminance gradient can be adjusted. In the embodiment, the actual (analog) luminance gradient in which the luminance is continuously changed is adjusted by controlling the (digital) gradation value that is changed in a step-wise manner. Thus, by further increasing the number of the gradations, it is possible to control the gradation value of the pixel more finely, which can make the gradation of the luminance gradient adjustment indistinctive.

In FIG. 8, "additional L1" represents signals written to pixels Pix included in pixel rows coupled to at least two scanning lines 5 including the scanning line 5 (for example, the scanning line 5a) positioned at the one end of the display area 7 in the Y direction and another scanning line 5 adjacent to the scanning line 5 in the writing period W of a first field period RF6. The idea of signal control in units of at least two pixel rows in the lower-order bit subframe period LB6 in the third modification is the same as that for the lower-order bit subframe period LB3 of the first modification.

Fourth Modification

Figure 9:
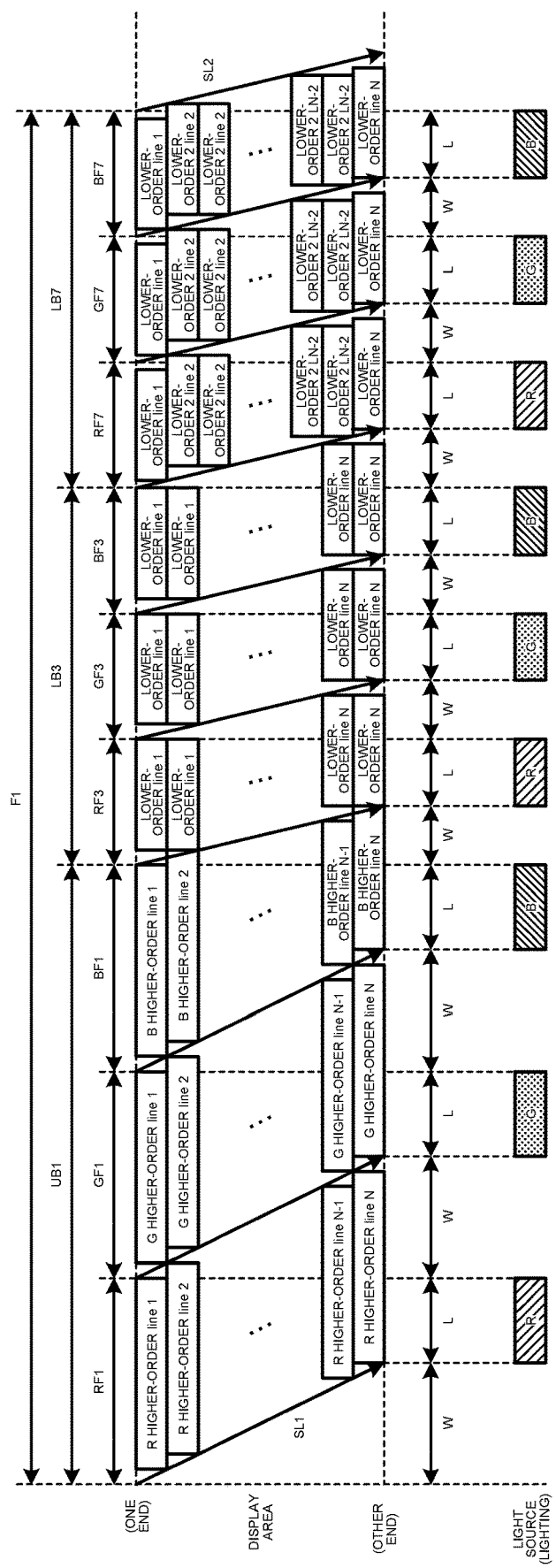
FIG. 9 is a time chart illustrating exemplary field sequential control in a fourth modification.

FIG. 9 is a time chart illustrating exemplary field sequential control in a fourth modification. The fourth modification is the same as the embodiment except that a lower-order bit subframe period LB7 is provided as an additional subframe period after the lower-order bit subframe period LB3 in the first modification. Specifically, the frame period F1 of the fourth modification includes the higher-order bit subframe period UB1, the lower-order bit subframe period LB3, and the lower-order bit subframe period LB7.

The lower-order bit subframe period LB7 is provided for writing unwritten signals when signals that would be written in a case of the lower-order bit subframe period LB2 are not written to the lower-order bit subframe period LB3 because signal control is performed in units of n pixel rows in the lower-order bit subframe period LB3. For example, when "lower-order line 1" in the lower-order bit subframe period LB3 represents signals written to pixels Pix included in a pixel row coupled to the scanning line 5 (for example, the scanning line 5a) positioned at the one end of the display area 7 in the Y direction in the lower-order bit subframe period LB2 (refer to FIG. 3) of the embodiment, "lower-order 2 line 2" in the lower-order bit subframe period LB7 represents signals written to pixels Pix included in a pixel row coupled to another scanning line 5 adjacent to the scanning line 5 positioned at the one end in the lower-order bit subframe period LB2 (refer to FIG. 3) of the embodiment.

In the lower-order bit subframe period LB7, pixel rows to which signals are written in units of n pixel rows are shifted by one row from those in the lower-order bit subframe period LB3. For example, "lower-order 2 line 2" in FIG. 9 represents signals written to pixels Pix included in pixel rows coupled to two scanning lines 5 including a "second scanning line 5" adjacent to the scanning line 5 (for example, the scanning line 5a) positioned at the one end of the display area 7 in the Y direction, and a scanning line 5 (third scanning line 5) adjacent to the "second scanning line 5" but not positioned at the one end in the writing period W of a first field period RF7. In addition, "lower-order 2 LN–2" in FIG. 9 represents signals written to pixels Pix included in pixel rows coupled to at least two scanning lines 5 including a "second-to-last scanning line 5" adjacent to the scanning line 5 positioned at the other end of the display area 7 in the Y direction and a scanning line 5 (third-to-last scanning line 5) adjacent to the "second-to-last scanning line 5" but not positioned at the one end in the writing period W of the first field period RF7. Specifically, "line 1" in "lower-order line 1" represents signals corresponding to pixels Pix on the first row. In addition, "line 2" in "lower-order 2 line 2" represents signals corresponding to pixels Pix on the second row. In addition, "N–2" in "lower-order 2 LN–2" represents signals corresponding to pixels Pix on the third row ((N–2)-th row) to the last row (N). In addition, "N–1" in "higher-order line N–1" represents signals corresponding to pixels Pix on the second row ((N–1)-th row) to the last row (N). In addition, "N" in "higher-order line N" and "lower-order line N" represents signals corresponding to pixels Pix on the last row (N).

As described above, according to the fourth modification, a disposition of a plurality of pixels Pix to which signals are written at a time in one of two writing periods W corresponding to the lower-order bits of the pixel signal is shifted in the first direction (Y direction) from a disposition of a plurality of pixels Pix to which signals are written at a time in the other writing period W. Thus, it is possible to restrain information from being discarded between inputting and outputting and restrain a shift in the first direction of pixels Pix to which signals corresponding to the lower-order bits are reflected.

In FIG. 9, signals written to the scanning line 5 (for example, the scanning line 5a) positioned at the one end of the display area 7 in the Y direction and the scanning line 5 (for example, the scanning line 5b) positioned at the other end of the display area 7 in the Y direction are controlled to be identical for the lower-order bit subframe period LB3 and the lower-order bit subframe period LB7, but signal writing to these pixel rows in the lower-order bit subframe period LB7 is not limited to this configuration but may be changed as appropriate. For example, the signal writing may be controlled such that signals written to the "second scanning line 5" are identical to signals written to the scanning line 5a, and such that signals written to the "second-to-last scanning line 5" are identical to signals written to the scanning line 5b. Alternatively the signal writing for the scanning lines 5a and 5b may be omitted.

The ratio between the light amount in each lighting period L of the lower-order bit subframe period LB3 and the light amount in each lighting period L of the lower-order bit subframe period LB7 is, for example, 1:1. However, the ratio is not limited thereto and may be changed as appropriate.

Fifth Modification

FIG. 10 is a time chart illustrating exemplary field sequential control in a fifth modification. Although FIGS. 3 to 9 exemplarily illustrate cases in which the number of colors of light emitted from the light source 11 is three, FIG. 10 illustrates a case in which light in a single color is emitted from the light source 11. In other words, the display device 100 of the fifth modification is a monochrome display device.

The frame period F1 in the fifth modification includes a higher-order bit subframe period UB2, a lower-order bit subframe period LB8, and a lower-order bit subframe period LB9. The higher-order bit subframe period UB2, the lower-order bit subframe period LB8, and the lower-order bit subframe period LB9 each include one writing period W and one lighting period L. Signals written in the writing period W of the higher-order bit subframe period UB2 are signals corresponding to the higher-order bits of the pixel signal. Signals written in the writing period W of the lower-order bit subframe period LB8 are signals corresponding to the lower-order bits of the pixel signal. In the fifth modification, there is no color distinction because pixel signals are monochrome. The idea of "signal corresponding to the higher-order bits" and "signal corresponding to the lower-order bits" in the fifth modification is the same as the idea of "signal corresponding to the higher-order bits" and "signal corresponding to the lower-order bits" in the embodiment except that there is no color distinction.

Signals written in the writing period W of the lower-order bit subframe period LB9 are used for extended gradation expression that is set based on the same idea as for signals in the lower-order bit subframe period LB6 described in the third modification. However, the example illustrated in FIG. 10 is different from the example illustrated in FIG. 8 in that such signal writing is performed in units of one pixel row (on a pixel row basis).

The present disclosure is also applicable to a configuration in which light in a single color is emitted from the light source 11 as exemplarily described in the fifth modification.

Sixth Modification

FIG. 11 is a time chart illustrating exemplary field sequential control in a sixth modification. In the embodiment, in the frame period F1, the first field period RF2, the second field period GF2, the third field period BF2 of the lower-order bit subframe period LB2 are provided after the first field period RF1, the second field period GF1, and the third field period BF1 of the higher-order bit subframe period UB1. However, in the sixth modification, the field periods included in the higher-order bit subframe period UB1 and the field periods included in the lower-order bit subframe period LB2 in the embodiment are alternately repeated. The sixth modification is the same as the embodiment except for this feature.

In the sixth modification, for example, as illustrated in FIG. 11, the first field period RF1, the second field period GF2, the third field period BF1, the first field period RF2, the second field period GF1, and the third field period BF2 are provided, in the order as listed, in the frame period F1. In this manner, in the sixth modification, the order of field periods is controlled such that field periods of the same color are discontinuous in time. When field periods for signals corresponding to the higher-order bits and field periods for signals corresponding to the lower-order bits are alternately provided and the order of field periods is controlled such that field periods of the same color are discontinuous in time, it is possible to more reliably prevent visual recognition of a pseudo contour and a color break by a user of the display area 7.

The number of colors of light emitted from the light source 11 is not limited to one or three but may be two, or four or more. In such a case as well, in the same manner as the above-described embodiment and modifications, control can be performed such that the light amount in one lighting period L, in which the light amount is larger than in other lighting periods L, corresponds to the higher-order bits of a pixel signal and the light amount in other lighting periods L corresponds to the lower-order bits of a pixel signal. In addition, control can be performed such that one frame period F1 includes a plurality of subframe periods, each subframe period includes a writing period W and a lighting period L corresponding to one of a plurality of colors included in the light source, continuous subframe periods correspond to different colors, one of the continuous subframe periods corresponds to the higher-order bits of a pixel signal, and the other subframe period corresponds to the lower-order bits of a pixel signal.

It should be understood that, among other effects achieved by aspects described in the present embodiment, those clear from the present specification description or those that could be thought of by the skilled person in the art as appropriate are achieved by the present disclosure.

What is claimed is:

1. A display device comprising:
 a display panel including a display area provided with a plurality of pixels; and
 a light source configured to emit light to the display panel, wherein
 writing periods and lighting periods are alternately provided in one frame period for at least one color,
 each writing period is a period in which part of a pixel signal is written to a corresponding one of the pixels,
 each lighting period is a period in which light is emitted to the pixel after a corresponding one of the writing periods,
 a light amount in at least one of the lighting periods is larger than a light amount in other lighting periods, and
 a first time length of each lighting period included in a higher-order bit subframe period and a second time length of each lighting period included in a lower-order bit subframe period are set so as to correspond to a ratio between higher-order bits of the pixel signal and lower-order bits of the pixel signal.

2. The display device according to claim 1, wherein
 the light source includes a first light source configured to emit light of a first color, a second light source configured to emit light of a second color, and a third light source configured to emit light of a third color, and
 the writing periods and the lighting periods are provided for each of the first color, the second color, and the third color.

3. The display device according to claim 1, wherein
 the light amount in the one lighting period, in which the light amount is larger than in the other lighting periods, corresponds to the higher-order bits of the pixel signal, and
 the light amount in the other lighting periods corresponds to the lower-order bits of the pixel signal.

4. The display device according to claim 3, wherein
 the display area includes a plurality of pixel rows arranged in a first direction,
 each of the pixel rows includes a plurality of pixels arranged in a second direction orthogonal to the first direction, and
 the lower-order bits of the pixel signals are written at a time to a predetermined number of pixels arranged in the first direction, the predetermined number being equal to or larger than two.

5. The display device according to claim 4, wherein the lower-order bits of the pixel signals for the predetermined number of pixels arranged in the first direction are averaged and written at a time to the predetermined number of pixels arranged in the first direction.

6. The display device according to claim 4, wherein two of the writing periods and two of the lighting periods corresponding to the lower-order bits of the pixel signal are provided in one frame period.

7. The display device according to claim 6, wherein a disposition of a plurality of pixels to which signals are written at a time in one of the two writing periods corresponding to the lower-order bits of the pixel signal is shifted in the first direction from a disposition of a plurality of pixels to which signals are written at a time in another writing period.

8. The display device according to claim 1, wherein
 the light amount in the one lighting period, in which the light amount is larger than that in the other lighting periods, corresponds to the higher-order bits of the pixel signal,
 the light amount in the other lighting periods corresponds to the lower-order bits of the pixel signal,
 the one frame period includes a plurality of subframe periods,
 each of the subframe periods includes the writing periods and the lighting periods corresponding to one of a plurality of colors included in the light source,
 continuous subframe periods correspond to different colors, and
 one of the continuous subframe periods corresponds to the higher-order bits of the pixel signal, and another subframe period corresponds to the lower-order bits of the pixel signal.

9. The display device according to claim 1, wherein the light amount depends on a lighting time of the light source.

10. The display device according to claim 1, wherein the light amount depends on luminance of the light source.

11. The display device according to claim 1, wherein display panel is a display panel in which a polymer-dispersed liquid crystal is enclosed between two facing substrates.

12. The display device according to claim 1, wherein the light source is provided on a side of the display panel.

13. The display device according to claim 1, wherein
the pixel signal for each of the pixels includes the higher-order bits and the lower-order bits, and
a scanning speed when writing the lower-order bits of the pixel signals to the pixels faster than a scanning speed when writing the higher-order bits of the pixel signals to the pixels.

14. The display device according to claim 1, wherein
the higher-order bits of the pixel signals are sequentially written pixel row by pixel row, and
the lower-order bits of the pixel signals are written in units of two pixel rows adjacent to each other at a time.

15. The display device according to claim 1, wherein
the pixel signal for each of the pixels includes the higher-order bits and the lower-order bits,
the higher-order bits of the pixel signals are sequentially written pixel row by pixel row,
the lower-order bits of the pixel signals in a first pixel row are written pixel row by pixel row in the same manner as the higher-order bits, and
the lower-order bits of the pixel signals in pixel rows subsequent to the first pixel row are written in units of two pixel rows adjacent to each other at a time.

16. The display device according to claim 1, wherein
the pixel signal for each of the pixels further includes middle-order bits between the higher-order bits and the lower-order bits, and
the middle-order bits of the pixel signals are written in units of two pixel rows adjacent to each other simultaneously at a writing time of a lower pixel rows of the two adjacent pixel rows.

* * * * *